(12) United States Patent
Butters et al.

(10) Patent No.: US 6,215,126 B1
(45) Date of Patent: Apr. 10, 2001

(54) PLUG AND METHOD OF MANUFACTURE

(75) Inventors: Brian E. Butters; Anthony Leonard Powell, both of London (CA)

(73) Assignee: Purifics Enviornmental Technologies, Inc., London (CA)

(*) Notice: Subject to any disclaimer, the term of this patent is extended or adjusted under 35 U.S.C. 154(b) by 0 days.

(21) Appl. No.: 09/146,453

(22) Filed: Sep. 3, 1998

(51) Int. Cl.[7] ....................................... F21V 29/00
(52) U.S. Cl. .................................. 250/483.1; 250/372
(58) Field of Search ............................................. 250/372

(56) References Cited

U.S. PATENT DOCUMENTS 5,019,256 * 5/1991 Ifill et al. ............................... 210/232
6,039,460 * 3/2000 Ng et al. ................................ 362/267

* cited by examiner

Primary Examiner—Constantine Hannaher
Assistant Examiner—Otilia Gabor
(74) Attorney, Agent, or Firm—Baker & McKenzie

(57) ABSTRACT

A plug for an enclosure for holding a radiation source is provided. The plug is formed from a material that emits visible light when the radiation source is energized, such that the status of the radiation source may be determined by an operator without the need for status monitoring equipment. The plug seals the radiation source from the environment to prevent ozone formation and to prevent leakage into or out of the enclosure.

33 Claims, 3 Drawing Sheets

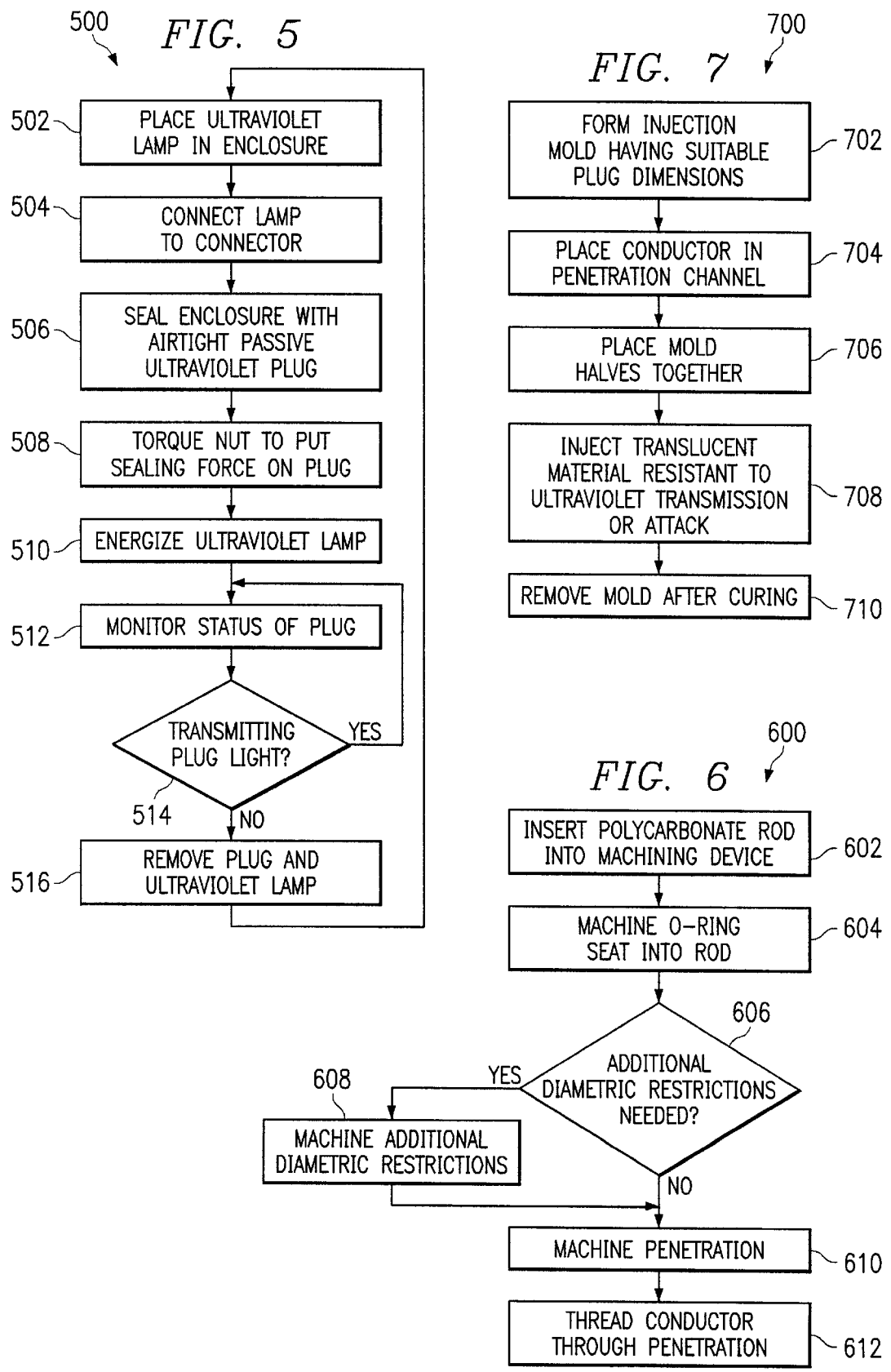

PLUG AND METHOD OF MANUFACTURE

FIELD OF THE INVENTION

The present invention relates to a plug and method of manufacture of a plug, and more particularly to a lamp plug operable to indicate instances when a radiation source is energized.

BACKGROUND

Treatment systems and techniques for removing contaminants from contaminated media (such as liquids, gasses, and solids) have been developed in the past. Such conventional treatment systems and techniques include treatments using ultraviolet radiation. Contaminated media are often exposed to ultraviolet radiation permitted by radiation source, such as an ultraviolet lamp, which causes contaminants in the media to become inactive or to be reduced or oxidized.

Although ultraviolet radiation treatment is an effective way to decontaminate contaminated media, several problems have been encountered with ultraviolet radiation treatments.

One problem is that ultraviolet lamps must be monitored in order to replace the lamps when they fail. An automated monitoring system may be used, but such systems typically require extensive wiring, metering, and controls. Automated systems are typically not utilized to their full potential because lamp failure does not need to be immediately detected. Thus, an automated system provides a higher level of monitoring than may be required, usually at a significantly greater cost.

Another problem encountered with ultraviolet radiation treatment systems is the generation of ozone. Because such systems are generally exposed to environmental oxygen, ozone is formed when the system is in operation. In an enclosed location, such as an indoor facility, such systems can generate potentially dangerous levels of ozone and must therefore be well ventilated.

Another problem encountered with ultraviolet radiation treatment systems is the breakage of the enclosures in which ultraviolet lamps are disclosed. Glass enclosures typically seal ultraviolet lamps from liquid media, and may be subject to hydrostatic pressures. When glass enclosures break, the leakage of the liquid media from the system may result in a hazardous condition.

SUMMARY OF THE INVENTION

Therefore, a need has arisen for a lamp plug and method of manufacture that allows the status of a lamp to be monitored without the need for active monitoring equipment.

In accordance with the present invention, a lamp plug and method of manufacture are provided that overcome problems inherent with known methods for monitoring lamp status.

One aspect of the present invention is a plug for an enclosure in which a radiation source, such as an ultraviolet lamp, is disposed. The plug is formed from a material that emits visible light when the radiation source is energized, such that the status of the radiation source may be readily determined by visual inspection and without the need for monitoring equipment. The plug also operates to seal the radiation source from the environment to prevent ozone formation and leakage into or out of the enclosure.

Another aspect of the present invention is an apparatus for holding a radiation source. The apparatus includes an external housing made of a transparent or translucent material. The external housing has at least one opening through which the radiation source may be inserted into the external housing. A plug is installed in the external housing that seals the opening of the external housing. The plug is made of a material that emits visible light when the radiation source is energized. One or more conducting elements are installed through the plug, which allow the radiation source to be electrically connected to an external power source.

Another aspect of the present invention is a method for decreasing ozone generation in a decontamination system. The method of the present invention includes placing each of two or more radiation sources in a corresponding enclosure. Each enclosure is sealed with an airtight translucent plug that emits light when the radiation source is operating. Each radiation source is electrically connected to a power source using a conductor that is installed through an airtight penetration of each airtight translucent plug.

Yet another aspect of the present invention is a method for manufacturing a plug for an enclosure that holds a radiation source. The method includes forming a plug from an ultraviolet-sensitive material having predetermined dimensions. A seal structure is then formed onto the plug, and a penetration is formed through the plug. A conductor is installed through the penetration in a manner so as to maintain an atmospheric seal.

The present invention provides many important technical advantages. One important technical advantage of the present invention is a passive status indicator for lamp functionality in a decontamination or disinfection system. The present invention utilizes material properties of ultraviolet-blocking or ultraviolet active materials to provide an indication of the operational status of a radiation source without requiring electronic monitoring equipment.

Another important technical advantage of the present invention is a method for preventing the formation of ozone in a disinfection or decontamination system. The present invention uses a plug that indicates the operability of the radiation sources of the system, thus allowing the system to be sealed without requiring expensive and complex monitoring equipment. The method of the present invention thus limits ozone formation while allowing the status of the radiation sources to be easily monitored.

BRIEF DESCRIPTION OF THE DRAWINGS

The accompanying drawings illustrate a preferred embodiment of the present invention wherein like reference numerals represent like parts, in which:

FIG. 5 is a flow chart of a method for decreasing ozone generation in a decontamination system in accordance with a preferred embodiment of the present invention;

FIG. 6 is a flow chart of a method for making a plug in accordance with a preferred embodiment of the present invention; and FIG. 7 is a flow chart of a method for manufacturing a plug in accordance with a preferred embodiment of the present invention.

DETAILED DESCRIPTION OF THE DRAWINGS

The following description, with reference to the accompanying drawing, details a preferred embodiment of the presention. It should, however, be appreciated that the present invention may be embodied in numerous other embodiments.

Figure 1:
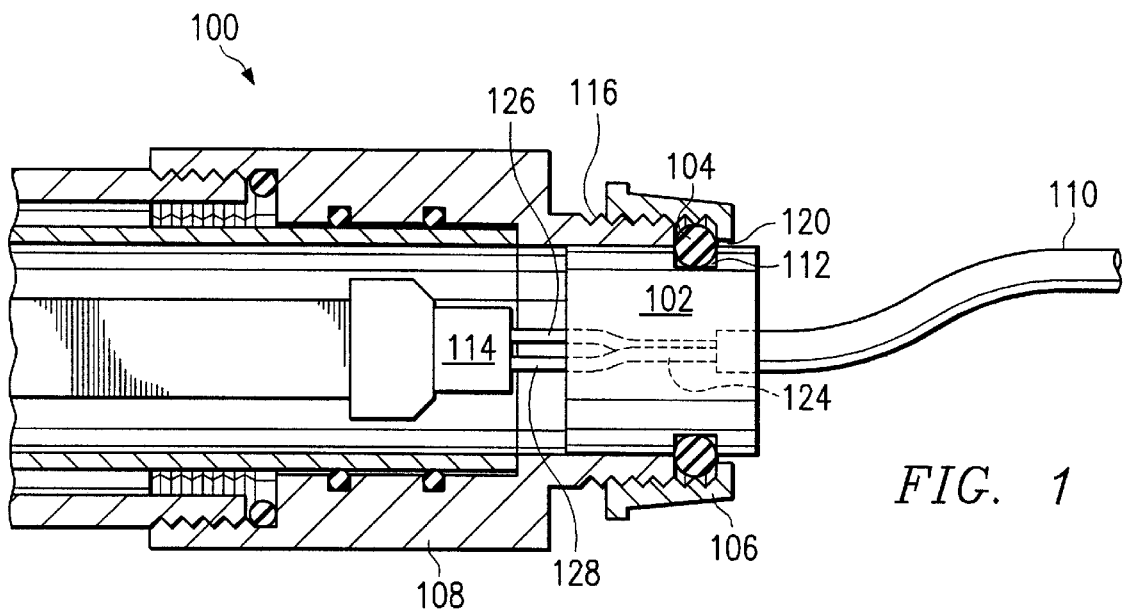
FIG. 1 is a diagram of a lamp plug assembly in accordance with a preferred embodiment of the present invention.
Figure 1A:
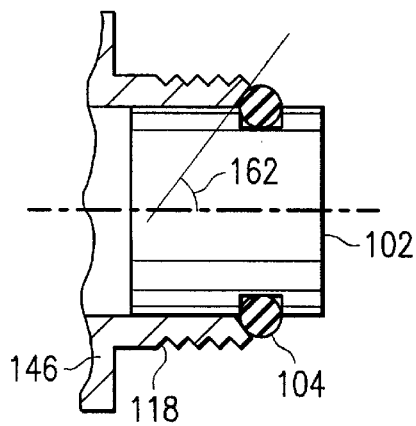

FIG. 1 is a diagram of a lamp plug assembly 100 in accordance with a preferred embodiment of the present invention. Lamp plug assembly 100 may be used to seal an enclosure, such as a quartz tube, in which a radiation source, such as an ultraviolet lamp, is disposed. The radiation source may, for example, be used to disinfect or decontaminate an aqueous or gaseous media.

Lamp plug assembly 100 includes plug 102, o-ring seal 104, and plug nut 106, all of which fit into enclosure 108. As shown, plug nut 106 is threaded with threads 118 and mates with threads 116 of enclosure 108. By applying a tightening torque to plug nut 106, a sealing pressure is exerted against plug 102, o-ring seal 104, and plug seat 114 of enclosure 108. In this manner, an airtight and water tight seal may be formed to prevent water or air from circulating beyond the seal formed by plug 102 and o-ring seal 104.

Plug 102 is preferably formed from a material that is ultraviolet luminous or ultraviolet blocking. For example, plug 102 may be formed of polycarbonate, such as by machining a cast polycarbonate block or polycarbonate rod. Polycarbonate material absorbs ultraviolet radiation, but allows visible light radiation to pass through. Thus, the visible light generated by an ultraviolet lamp or other suitable radiation source will transmit through plug 102, whereas the ionizing ultraviolet radiation will be blocked. Also or alternatively, plug 102 may be formed of a material that is ultraviolet luminescent. For example, plug 102 may comprise a polymer, epoxy, plastic, or other suitable material that is ultraviolet luminescent, or that contains a filler that is ultraviolet luminescent. The ultraviolet luminescent material will absorb ultraviolet light and emit visible light. Thus, when an ultraviolet lamp disposed in enclosure 108 is active, plug 102 will emit visible light.

Plug nut 106 includes cable and viewing penetration 120. Cable and viewing penetration 120 provides an opening to plug 102 through which cable 110 extends so as to allow an operator to view the status of plug 102.

Cable 110 includes conductors 126 and 128. Cable 110 is used to provide electric power to the ultraviolet lamp contained within enclosure 108. Cable 110 extends through plug 102 and cable penetration 124, and the jacket of cable 110 may be used to form an environmental seal. Cable 110 may alternatively comprise a penetration assembly that is configured to rotate freely from plug 102, such that plug 102 may be rotated without placing a torque on cable 110. Other suitable configurations may be used to provide for the penetration of plug 102 with cable 110.

Plug 102 includes o-ring seal seat 112. O-ring seal seat 112 may be machined onto plug 102 during the manufacturing machining of plug 102. Also or alternatively, if plug 102 is formed by injection molding or other suitable processes, o-ring seal seat 112 may be formed as part of the injection molding process.

Enclosure 108 includes plug seat 114 and threads 116. Plug seat 114 is a suitable chamfered region in enclosure 108, such that a force may be applied to plug 102 and o-ring 104 in order to form a seal against the chamfered edge of enclosure 108. In this manner, a pressure differential may exist between the interior and exterior of enclosure 108 without allowing liquids or gasses to pass through the seal created by plug 102, o-ring seal 104 and enclosure 108. This seal may be used to contain liquids within enclosure 108 in the event of a catastrophic failure of enclosure 108, or to prevent ozone and other harmful materials from leaving enclosure 108 if they are formed during normal irradiation processes.

In operation, lamp plug assembly 100 is used to seal an enclosure that holds an ultraviolet lamp or other suitable radiation source that may be used for disinfecting and decontaminating a gaseous or liquid media. Plug 102 is formed of a material that emits visible light and blocks harmful ultraviolet radiation or other harmful radiation, such that an operator may determine the operational status of the lamp contained within enclosure 108 by observing the plug 102 through cable and viewing penetration 120 of plug nut 106. Cable penetration 124 allows cable 110 to enter enclosure 108 and provide power to the ultraviolet lamp or other energy source without allowing moisture or air to enter or exit enclosure 108. In this manner, ozone formed by the action of the ultraviolet lamp or other energy source within enclosure 108 may not exit and is contained within enclosure 108, thus maintaining the safety of the work environment external to enclosure 108. In addition, if enclosure 108 is used to seal the ultraviolet lamp from a gaseous or aqueous media, o-ring seal 104 prevents catastrophic failure of enclosure 108 from resulting in leakage of the gaseous or aqueous media into the external environment.

Figure 2:
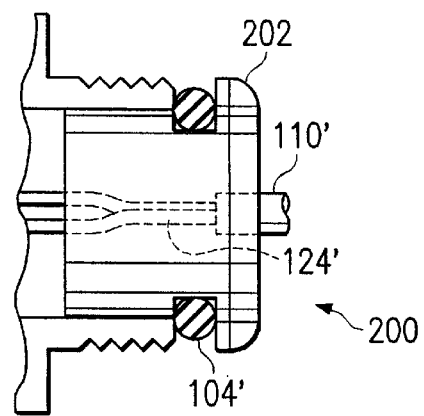
FIG. 2 is a diagram of an enclosure plug assembly in accordance with a preferred embodiment of the present invention.

FIG. 2 is a diagram of an enclosure plug assembly 200 in accordance with a preferred embodiment of the present invention. Enclosure plug assembly 200 includes plug 202, enclosure 108, and o-ring seal 104. Plug 202 fits within interior of enclosure 108, and is held in position by o-ring seal 104. In this manner, plug 202 forms a seal against enclosure 108.

Plug 202 may be formed from similar materials and using similar processes as plug 102 of FIG. 1. For example, plug 202 may be formed by machining a polycarbonate or other ultraviolet blocking material, or by injection molding of an epoxy, polymer, plastic, or other material that is ultraviolet luminescent or that contains ultraviolet-luminescent filler material. O-ring channel may be formed by machining, by an injection molding process, or by other suitable processes such as a combination of injection molding and machining. Cable 110 extends through cable penetration 124' into the interior of enclosure 108. Cable penetration 124' may be a fixed penetration, such that the jacket of cable 110' forms an airtight seal, or may be an airtight penetration assembly that allows cable 110' to rotate about an axis such that plug 202 may be turned axially. Cable penetration 124' may also or alternatively comprise two or more penetrations, as suitable.

In operation, enclosure plug assembly 200 may be used to provide a seal for an enclosure 108 that is not required to be maintained against significant differential pressure variations. For example, plug 202 may be used where the ambient pressure differential between the outside of enclosure 108 and the inside of enclosure of does not exceed a predetermined value, such as one-tenth of one atmosphere. This predetermined value is determined by the seal force that may be applied by o-ring seal 104.

Figure 3:
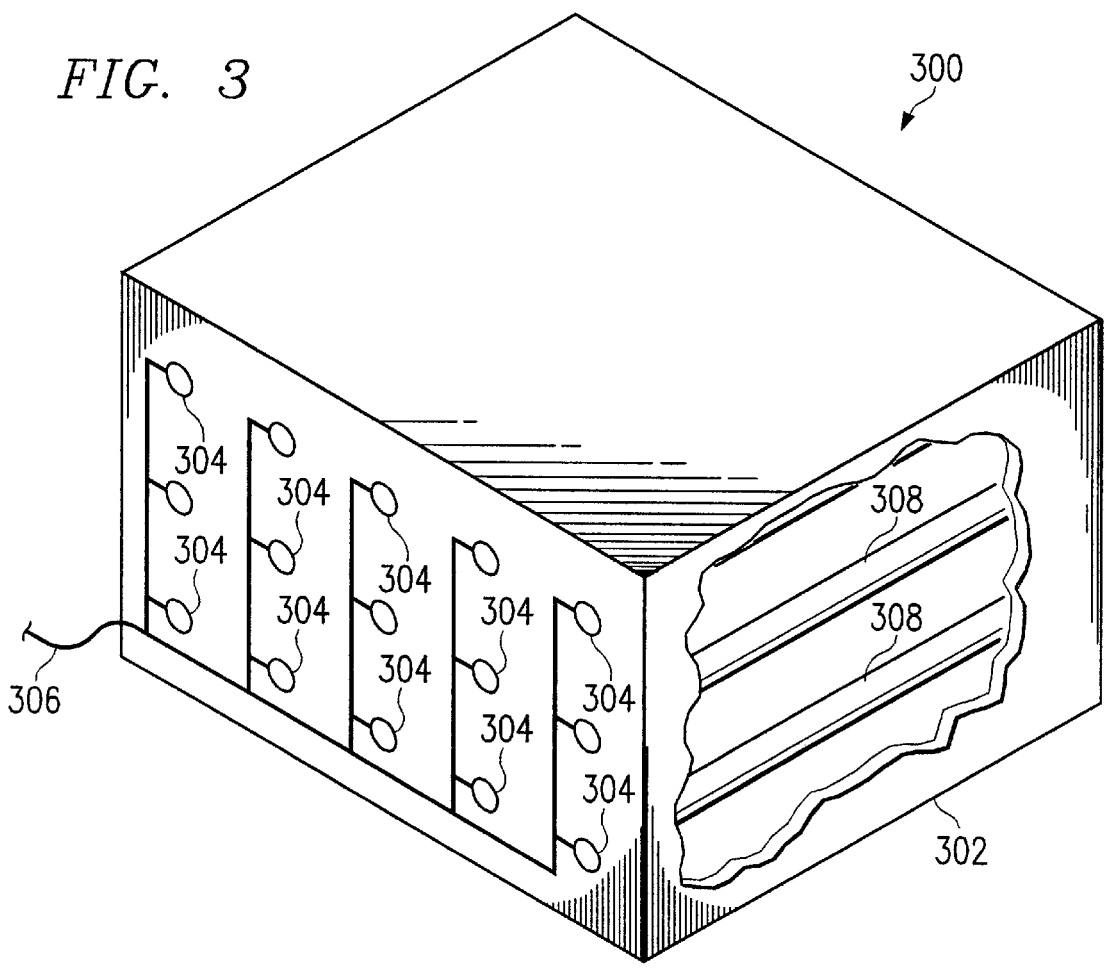
FIG. 3 is a diagram of a decontamination system in accordance with a preferred embodiment of the present invention.

FIG. 3 is a diagram of a decontamination system 300 in accordance with a preferred embodiment of the present invention. Decontamination system 300 includes decontamination tank 302 which holds one or more enclosures 308. Each enclosure 308 may be plugged with an ultraviolet-activated plug 304, which either allows visible light from ultraviolet lamps contained within enclosures 308 to exit while blocking the ultraviolet light, or which absorbs ultraviolet light and generates visible light. Conductor 306 may extend through an ultraviolet-activated plug 304 to a lamp contained within an enclosure 308.

Enclosures 308 are preferably quartz tubes, but may be formed of other suitable shapes and materials for holding an ultraviolet lamp. An enclosure 308 may contain an ultraviolet lamp that receives power through conductor 306. An ultraviolet lamp emits radiation into decontamination tank 302 that causes contaminants within contaminated media contained in decontamination tank 302 to break down and/or be reduced or oxidized.

In operation, an operator may determine the operational status of the ultraviolet lamps contained within each enclosure 308 by observing the status of ultraviolet-activated plug 304. If ultraviolet-activated plug 304 is emitting light, that indicates that the lamp contained within enclosure 308 is active. Alternatively, if ultraviolet-activated plug 304 is not emitting light, that indicates that the lamp contained within that enclosure is not operational and may require repair or replacement. In response, an operator may remove ultraviolet-activated plug 304 and then remove the failed lamp. For example, the failed lamp may be connected to a conductor 306 that extends through a penetration of ultraviolet-activated plug 304. The failed lamp may be disconnected from conductor 306 and removed from enclosure 308, and the new lamp may then be inserted into the enclosure 308 and connected to conductor 306. The enclosure 308 is then sealed with ultraviolet-activated plug 304. In this manner, the ultraviolet lamps of decontamination system 300 may be replaced in service without requiring decontamination system 300 to be taken out of service. Also, if an enclosure 308 has catastrophically failed such that the media contained within decontamination tank 302 has entered the enclosure 308, this may be determined by an electrical continuity test using conductor 306 (for liquid media), or through other means, such as by observing leakage around ultraviolet-activated plug 304 during plug removal. In that event, ultraviolet-activated plug 304 may be kept in place to allow decontamination system 300 to operate until a scheduled outage occurs and the liquid contained within decontamination tank 302 has been drained.

Figure 4:
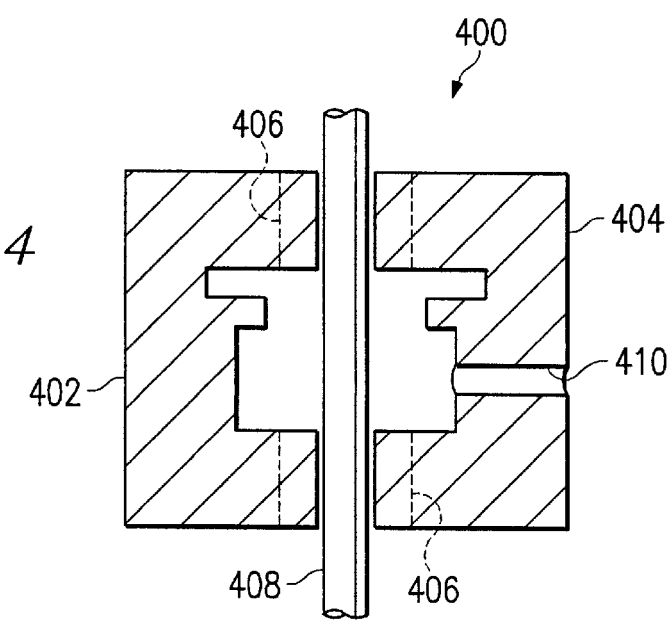
FIG. 4 is a diagram of an injection mold for manufacturing a plug in accordance with a preferred embodiment of the present invention.

FIG. 4 is a diagram of an injection mold 400 for manufacturing a plug in accordance with a preferred embodiment of the present invention. Injection mold 400 includes mold halves 402 and 404, respectively. Mold halves 402 and 404 are configured to form a complete injection mold for the manufacture of a plug, such as, for example, plug 102 or plug 202 of FIGS. 1 and 2, respectively. As illustrated in FIG. 4, mold halves 402 and 404 are operable for the manufacture of plug 102 of FIG. 1. Penetration channel 406 of mold halves 402 and 404 allows a penetration spacer 408 to be inserted into the mold to allow a suitable cable penetration to be formed. Also or alternatively, mold halves 402 and 404 may be configured for no penetration, and a penetration may be formed by machining one or more holes axially through the plug formed by the injection molding process.

In addition, mold half 404 includes injection port 410. A suitable plug material may be injected into injection mold 400 through injection port 410. For example, the material may be an epoxy, a plastic, a polymer, or other suitable materials that are ultraviolet blocking or ultraviolet luminescent, or that contain ultraviolet blocking or ultraviolet luminescent fillers. In this manner, the operational status of an ultraviolet lamp contained within an enclosure be determined by an operator.

In operation, mold halves 402 and 404 are placed together, either with a penetration spacer 408, or without penetration spacer 408 in the event that a penetration will be machined. A suitable material is injected through injection port 410, and after the material has set the mold halves are removed, allowing the formed plug to be further processed.

FIG. 5 is a flow chart of a method 500 for decreasing ozone generation in a decontamination system in accordance with a preferred embodiment of the present invention. Method 500 begins at step 502, where the ultraviolet lamps for the decontamination system are placed into enclosures, such as a quartz tube assembly or rack. The method then proceeds to step 504, where the enclosures are sealed with an airtight plug that has been formed from a material that is responsive to ultraviolet radiation. For example, the material may be polycarbonate or other suitable materials that absorb the ultraviolet radiation and transmit the visible light generated by the ultraviolet lamps. Also or alternatively, the material may be an ultraviolet-luminescent material that absorbs ultraviolet light and generates visible light, or the material may be a polymer or other suitable base material that has an ultraviolet-luminescent material dissolved or dispersed within.

The enclosure may be sealed, for example, by installing the plug into the enclosure with an o-ring seal that is configured to provide a sealing force, or may also or alternatively be sealed by installing the plug into the enclosure with a nut that is used to apply a sealing force to an o-ring, a gasket, or other suitable seal. After the enclosure has been sealed at step 504, the method proceeds to step 506.

At step 506, a sealing force is applied to the plug if necessary. For example, if a nut is used to hold the plug in place and to apply a sealing force to the plug, then the nut may be torqued to a predetermined torque to apply a sealing pressure to the o-ring, gasket, or other sealing material. Alternatively, the plug may be threaded if the cable penetration through the plug is capable of allowing the plug to rotate about an axis without causing the cable to twist and become damaged, in which case a sealing torque is applied directly to the plug at step 506. The method then proceeds to step 508.

At step 508, the ultraviolet lamps are connected to a power source by connecting the electrical penetration to a cable and power source, as suitable. All of the ultraviolet lamps in a decontamination or sterilization rack may be connected either in series or in parallel, as suitable, but are typically connected in parallel. The status of the plugs and thus the lamps is then monitored at step 510. For each plug, it is determined whether the plug is emitting visible light at step 512. If the plug is not emitting visible light, then the method proceeds to step 514 where the ultraviolet lamp for the corresponding enclosure is replaced. If it is determined at step 512 that the plug is emitting light, then the method proceeds to step 516, where the next plug to be monitored is determined. The method then returns to step 512 for monitoring of subsequent plugs.

In operation, method 500 may be used to monitor the status of radiation sources such as an ultraviolet lamps for decontamination and disinfection equipment without requiring the use of expensive automatic monitoring equipment that performs electrical measurements, or that requires electrical or electronic sensors. Method 500 is adapted for use in systems that may continue to operate with several radiation sources disabled, such that the radiation sources are typically replaced according to a predetermined maintenance schedule. Method 500 is also adapted for use with systems that allow the radiation sources to be changed out in-process, such that failed lamps may be removed from lamp enclosures and replaced with operational lamps without removing the system from operation.

FIG. 6 is a flow chart of a method 600 for making a plug in accordance with the preferred embodiment of the present invention. Method 600 begins at step 602, where a polycarbonate rod segment is inserted into a machining device. For example, the machining device may be a milling machine or other suitable machining devices. The method then proceeds to step 604.

At step 604, an o-ring seat or other suitable seal is machined into the polycarbonate rod. For example, a channel may be machined circumferentially around the rod with a suitable width so as to accept and hold an o-ring seal. The method then proceeds to step 606, where it is determined whether additional diametric restrictions are required. For example, the enclosure may include a chamfered edge such that the plug seats against the chamfer. Also or alternatively, threads may be machined onto the plug such as if a free-turning cable penetration is used so that the plug may be tightened without placing a torque on the cable that penetrates the plug. If it is determined at step 606 that these additional diametric restrictions are required, the method proceeds to step 608 where the additional diametric restrictions are machined onto the polycarbonate rod. The method then proceeds to step 610.

At step 610, a cable penetration is machined into the plug. For example, a single cable penetration may be drilled axially through the centerline of the plug, two or more cable penetrations may be drilled axially through various locations on the plug, or other suitable cable penetrations may be formed. The method then proceeds to step 612, where a conductor is threaded through the penetration or penetrations formed at step 610. For example, a conductor may be threaded through a machined penetration such that the conductor jacket forms a seal against the penetration. Alternatively, a penetration assembly may be used that allows the plug to rotate around the conductor, such that no torque is applied to the conductor if the seal rotates. Other suitable configurations may also be used to provide the conductor through the plug to the interior of the enclosure.

In operation, method 600 may be used to manufacture a plug that either blocks harmful radiation from an ultraviolet lamp or other radiation source while allowing visible light to pass through the plug, or that absorbs the harmful radiation and emits visible light. Method 600 may be automated so as to be performed without operator intervention, or may also or alternatively include steps that require operator action.

FIG. 7 is a flow chart of a method 700 for manufacturing a plug in accordance with a preferred embodiment of the present invention. Method 700 may be used to manufacture a plug using an injection molding process. Method 700 begins at step 702, where an injection mold having suitable plug dimensions is formed, such as from a machining process in which computer-assisted design drawings are used to control a machining device that machines the mold halves from a suitable material. The method then proceeds to step 704, where a conductor or spacer is placed in a penetration channel of the mold, if one is utilized. The mold halves or other pieces are then assembled at step 706.

The method then proceeds to step 708, where ultraviolet-active material is injected into the mold. For example, an epoxy, plastic, polymer or other suitable material that is ultraviolet-luminescent or that contains ultraviolet-luminescent fillers may be injected through an injection port of the mold and is allowed to cure. Also or alternatively, the material used to form the plugs may be an ultraviolet-absorbing material that allows visible light to pass through, such as a polycarbonate material. Curing may take place at certain predetermined temperatures or under other suitable conditions. The method then proceeds to step 710, where the plug is removed from the mold and prepared for use, such as by sanding, machining, and/or finishing.

In operation, method 700 may be used to manufacture plugs for enclosures that hold ultraviolet lamps for decontamination or disinfection processes. The lamp plugs manufactured by method 700 may require additional processing before they are suitable for use in an enclosure, or may be manufactured to be ready-to-use.

While an embodiment of the present invention has been described in detail, the present invention may include embodiments different from those described, yet within the scope of the claims. For example, the "plug," "o-ring seal," "enclosure," and "ultraviolet lamp" may be implemented in a manner that is functionally identical but structurally different from that shown herein. Such changes are contemplated as being within the scope of the present invention. Likewise, the present invention may be implemented in disinfection and decontamination systems that use air or other suitable gases and water or other suitable solvents. Although ultraviolet lamps have been described in many of the figures, any suitable radiation source may be used in the embodiments shown without departing from the spirit or the scope of the present invention. Suitable radiation active materials, such as those that block the transmission of the radiation source while allowing visible light to be transmitted, and those that absorb the radiated energy from the radiation source and emit visible light, may be used where suitable.

While the present invention has been described with reference to a preferred embodiment, this description is not intended to be construed in a limiting sense. Various modifications and combinations of the preferred embodiment, as well as other embodiments of the invention, will be apparent to persons skilled in the art upon reference to the description. It is therefore intended that the appended claims not be limited to the described preferred embodiment and instead encompass any such modifications or embodiments.

What is claimed is:

1. A plug for an enclosure in which a radiation source is disposed, wherein the plug comprises ultraviolet-activated material that emits visible light when the radiation source is energized.

2. The plug of claim 1 wherein the radiation source is an ultraviolet lamp.

3. The plug of claim 2 wherein the material substantially blocks ultraviolet light but not visible light emitted by the ultraviolet lamp.

4. The plug of claim 2 wherein the material passes from an inactive state to an active state by absorbing ultraviolet light and emitting visible light.

5. The plug of claim 1 wherein the material from which the plug is formed comprises a polycarbonate substance.

6. The plug of claim 1 further comprising a watertight seal that prevents the ingress or egress of water from the enclosure.

7. The plug of claim 1 further comprising a fastener operable to fasten the plug to the enclosure, thereby maintaining the plug in position.

8. The plug of claim 1 further comprising one or more conducting elements extending through the plug, so as to allow the radiation source to be electrically connected to a power source external to the enclosure.

9. An apparatus for holding a radiation source comprising:
   an external housing formed from a transparent or translucent material, the external housing having at least one opening through which the radiation source may be inserted into the external housing;
   a plug disposed in the opening of the external housing, wherein the plug comprises ultraviolet-activated material that emits visible light when the radiation source is energized; and
   one or more conducting elements extending through the plug, so as to allow the radiation source within the external housing to be electrically connected to a power source external to the enclosure.

10. The apparatus of claim 9 wherein the external housing is a quartz tube.

11. The apparatus of claim 9 wherein the radiation source is an ultraviolet lamp.

12. The apparatus of claim 9 wherein the material from which the plug is formed comprises a polycarbonate substance.

13. The apparatus of claim 9 further comprising a threaded nut, where the opening of the external housing is threaded in a manner to mate with the threaded nut, and the threaded nut and external housing are configured to maintain the plug in position.

14. The apparatus of claim 9, wherein the plug material substantially blocks ultraviolet light but not visible flight emitted from the radiation source.

15. The apparatus of claim 9, wherein the plug comprises ultraviolet luminescent material.

16. The apparatus of claim 9, wherein the plug is visible outside the enclosure.

17. A method for decreasing ozone generation in a decontamination system comprising:
   disposing a radiation source in an enclosure;
   sealing the enclosure with an airtight ultraviolet-activated plug, that is operable to emit light when the radiation source is energized; and
   electrically connecting the radiation source to a power source using a conductor that extends through an aperture formed in the airtight ultraviolet-activated plug.

18. The method of claim 17 further comprising:
   periodically monitoring the status of the plug to determine if the plugs is not emitting light; and
   replacing the radiation source when the plug is not emitting light.

19. The method of claim 17 wherein sealing the enclosure with an airtight translucent plug further comprises:
   installing the plug into the enclosure with an o-ring seal between the plug and the enclosure; and
   installing a fastener into the enclosure so as to apply a force to the plug, the o-ring seal, and the enclosure, thereby sealing the enclosure.

20. The method of claim 19 wherein the fastener is a threaded fastener.

21. The method of claim 17, wherein sealing the enclosure with an airtight ultraviolet plug further comprises:
   sealing the enclosure with an airtight plug comprising material, wherein the material substantially blocks ultraviolet light but not visible light emitted by the radiation source.

22. The method of claim 17, wherein sealing the enclosure with an airtight ultraviolet plug further comprises:
   sealing the enclosure with an airtight plug comprising ultraviolet luminescent material.

23. The method of claim 17, wherein sealing the enclosure with the airtight ultraviolet activated plug further comprises:
   sealing the enclosure with an airtight ultraviolet activated plug, wherein the plug is visible outside the decontamination system.

24. A method for making a plug for an enclosure holding a radiation source comprising:
   forming a plug from ultraviolet-activated material having predetermined dimensions;
   forming a seal structure onto the plug;
   forming a penetration through the plug; and
   installing a conductor through the penetration.

25. The method of claim 24 wherein forming the plug from the ultraviolet-sensitive material having predetermined dimensions comprises machining a polycarbonate material to form a cylinder having a predetermined radius and length.

26. The method of claim 24 wherein forming the plug from the ultraviolet-sensitive material having predetermined dimensions comprises injecting an ultraviolet-luminescent material into a mold having predetermined dimensions.

27. The method of claim 24 wherein forming a seal structure onto the plug comprises machining an o-ring seat into the plug.

28. The method of claim 24 wherein forming a penetration through the plug comprises machining an axial hole through the plug.

29. The method of claim 24 wherein forming the penetration through the plug comprises injecting an ultraviolet-luminescent material into a mold having predetermined dimensions and a penetration channel.

30. The method of claim 24 wherein installing the conductor through the penetration comprises threading a conductor through a machined hole.

31. The method of claim 24 wherein installing the conductor through the penetration comprises:
   placing a conductor into a penetration channel in an injection mold; and
   injecting an ultraviolet-luminescent material into the mold so as to surround the conductor in the penetration channel.

32. The method of claim 24, wherein forming the plug from ultraviolet-activated material further comprises:
   forming the plug from material, wherein the material substantially blocks ultraviolet light but not visible light emitted by the radiation source.

33. The method of claim 24, wherein forming the plug from ultraviolet-activated material further comprises:
   forming the plug from ultraviolet luminescent material.

* * * * *

UNITED STATES PATENT AND TRADEMARK OFFICE
CERTIFICATE OF CORRECTION

PATENT NO.    : 6,215,126 B1
DATED         : April 10, 2001
INVENTOR(S)   : Brian E. Butters; Anthony Leonard Powell It is certified that error appears in the above-identified patent and that said Letters Patent is hereby corrected as shown below:

<u>Column 4,</u>
Line 48, delete "124'" and insert in lieu thereof -- 124 --;
Line 49, delete "124'" and insert in lieu thereof -- 124 --;
Line 50, delete "110'" and insert in lieu thereof -- 110 --;
Line 52, delete "110'" and insert in lieu thereof -- 110 --;
Line 60, after the words "of enclosure of" insert the word -- 204 --;

<u>Column 9, claim 14,</u>
Line 31, delete "flight" and insert in lieu thereof -- light --.

Signed and Sealed this

Sixth Day of November, 2001

Attest:

*Nicholas P. Godici*

NICHOLAS P. GODICI
*Attesting Officer*     *Acting Director of the United States Patent and Trademark Office*